(No Model.)
A. J. REYNOLDS.
MALT STIRRING MACHINE.
No. 325,012. Patented Aug. 25, 1885.
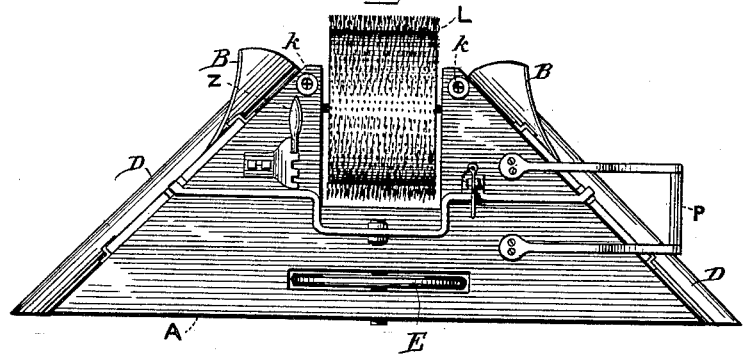
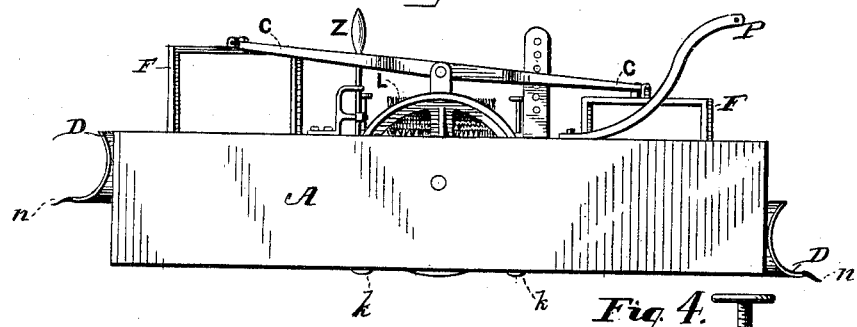
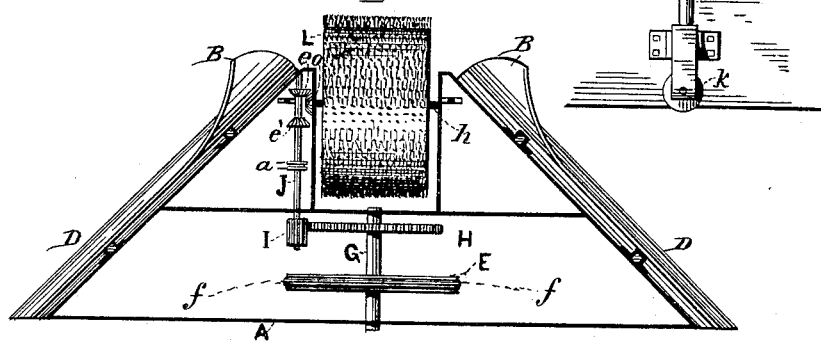
WITNESSES:
Geo. A. Vaillant.
D. Eugene Starr
INVENTOR
Andrew Jackson Reynolds

UNITED STATES PATENT OFFICE.

ANDREW JACKSON REYNOLDS, OF CHICAGO, ILLINOIS.

MALT-STIRRING MACHINE.

SPECIFICATION forming part of Letters Patent No. 325,012, dated August 25, 1885.

Application filed April 20, 1885. (No model.)

*To all whom it may concern:*

Be it known that I, ANDREW JACKSON REYNOLDS, a citizen of the United States, residing at Chicago, in the county of Cook and State of Illinois, have invented certain new and useful Improvements in Malt-Stirring Machines, of which the following is a description.

This invention relates to the preparation of malt for the manufacture of beer; and the invention consists of a machine to be used for stirring and airing the grain while being converted into malt, as hereinafter more fully set forth.

Figure 1 is a plan view, and Fig. 2 a side elevation; Fig. 3, a plan view with top removed, to show the operating mechanism; Fig. 4, a section showing one of the elevating and lowering wheels.

As is generally known, malt is prepared by moistening the barley or other grain, and afterward keeping it at the proper temperature to insure its germination up to a certain point, beyond which it must not be permitted to extend, or it will be spoiled, the object being to convert the starch of the grain into sugar by the fermentation of which at a subsequent stage the alcohol contained in the beer is produced.

It is necessary during the preparation of the malt, which requires (by hand-turning) from one to two weeks, that the mass of grain, which is spread upon a suitable floor, should be stirred up, turned over, spread out, and aired frequently, the oftener the better, in order that the entire mass may be kept at a uniform degree of moisture and temperature, so that the growing and chemical change shall proceed with uniformity in all the kernels composing the mass, as otherwise it will not be of uniform quality when germinated. Another reason for this frequent stirring of the mass is that during the process each kernel of the grain sends out a mass of rootlets, and if permitted to remain stationary the mass would soon become matted together by the growth of these rootlets throughout the mass. It is therefore necessary to stir up and spread out this mass of grain or malt at least once in every eight hours or oftener, day and night, this operation being performed by means of wooden shovels wielded by laborers walking on the tender malt, destroying at each stirring much of the growing grains and rootlets—a tedious and expensive operation. If it could be done as often as once in three hours, the quality of the malt would be much improved; but the labor and expense required generally prevent this from being done.

The object of my invention, therefore, is to provide a machine by which this work can be more rapidly and more effectively done. To do this I make a machine in the form of a plow, as shown, B indicating the mold-board, and A the landside. It may be of galvanized iron or of wood, as preferred, and may be double ended to avoid turning it around, or it may be single. A flexible or hinged share, D, and the mold-board B are connected together or formed in one piece, and the share is raised and lowered by balance-lever attachments C C, Fig. 2, so that its outer edge may at all times fit close down to the floor, and be sure to pass underneath the grain or malt, and in order to prevent it from riding over any of the grain or from crushing it I secure to the outer edge of this share D a strip of rubber or similar material, $n$ $n$.

The shares D have the frames F connected to them, as shown, and to these frames the ends of balance-levers C C are hinged, so that there is formed a hinged connection between the two, and as one share is raised the other is lowered.

Within the body of the machine I locate in suitable bearings a shaft, G, on which is secured a drive-wheel, F, as shown in Fig. 3, said wheel being provided with a rubber tire, $f$, for the double purpose of causing it to take hold on the floor and to prevent crushing the grain. On this shaft G is also secured a gear-wheel, H, which imparts motion through a pinion, I, to a parallel shaft, J, which carries near its opposite end two bevel-pinions, $e$ and $e'$, and which in turn engage with another bevel-pinion, $o$, rigidly secured to a shaft, $h$, on which is mounted a wheel, L, as shown in Fig. 3. The shaft J is arranged to have an endwise movement in its bearings, so as to throw the pinion $e$ or $e'$ into gear with pinion $o$ at will for the purpose of enabling the distributer-wheel and brush to be rotated in the same direction whichever end foremost the machine may be propelled, there being a shipping-lever, Z, pivoted to the body of the machine at any suitable or convenient point and having its inner end forked so as to embrace the shaft I and rest between two collars, $a$, thereon. (Shown in Fig. 3.) The distributer-wheel and brush L is located so as to rotate at right angles to the line of movement of the machine and directly at the rear end of the mold-board B, the object being to have this wheel L catch the grain or malt as it passes from the rear end of the mold-board and share and separate or break up the mass, and at the same time stir it up and throw it off to one side, airing it and spreading it evenly on the floor. It should be understood that in consequence of the growth of the rootlets of the grain during its treatment there is a constant tendency of it to mat together in a mass, and hence the necessity of so constructing and arranging the wheel L that it will not only move the mass, but also air it and break it up and separate and scatter the kernels of grain, and also sweep it clean from the floor, so as to prevent it from being trod upon and crushed by the operator.

It is obvious that the wheel may be modified more or less in its construction, so long as it possesses the features which will enable it to perform the work required of it, as herein set forth.

In order to enable the operative to propel the machine, it is provided with a suitable handle, P, by which it is to be shoved along in the same manner as a lawn-mower, and if the machine be made double-ended, as shown, the handle may be pivoted to the machine so it can be reversed, or with any equivalent means for that purpose. Two small adjustable bearing-wheels, $k$, are secured to inner face of the mold-board, as indicated in Fig. 4, to support that side of the machine, its other side being supported on the drive-wheel E, so that while the movable share B rests and runs on the floor the weight of the machine will rest upon the wheels E and $k$, by which means it can be more easily propelled and raised and lowered.

The manner of using the machine is simply to place it on the floor where the malt is being treated, care being taken to clear a space for it on the floor and then push it across the room. As it is moved forward the share and mold-board will raise the grain or malt in its path, and delivering it to the rotating wheel L the latter will separate the kernels and throw them off to one side, in that way disintegrating the mass and stirring it up, airing it more thoroughly than can be done with shovels or spades. When it has reached the opposite side of the room, it will be moved sidewise a distance equal to its width, or nearly so, and reversed, and the machine shoved back across the floor, and so on continuously until the entire floor has been gone over and the whole mass thus stirred about and the kernels separated. It will readily be seen that by the use of this machine the work can be greatly expedited and correspondingly cheapened.

Having thus described my invention, what I claim is—

1. A malt-stirring machine consisting of a mold-board, B, and share D, and a distributing-wheel, L, arranged to operate substantially as and for the purpose set forth.

2. In combination with the mold-board and share for raising the grain, and a wheel, L, for disintegrating the mass and distributing the same, a traction-wheel, E, connected with wheel L for imparting motion to it, substantially as described.

3. The combination, in a machine, substantially such as described, of a rotating distributing or stirring wheel, L, a traction-wheel, E, for imparting motion to the same, and intermediate mechanism, such as described, whereby said distributing or stirring wheel may be made to rotate continuously in one direction while the driving-wheel moves in either direction, as set forth.

4. In combination with the mold-board B, a hinged or flexible adjustable share, D, substantially as and for the purpose set forth.

5. In a malt-stirring machine, the combination, with the share and mold-board, of the revolving brush at the lower portion of the machine to agitate the malt and move it from the machine, substantially as described.

6. In a malt-stirring machine, the combination, with a brush to agitate and move the malt, of a drive-wheel, E, having connection with said brush and provided with a rubber tire, $f$, to give it adhesion, substantially as described.

7. In a malt-stirring machine mounted on a wheel, the combination of a curved share and mold-board mounted on the machine in front of its wheel and obliquely thereto, substantially as and for the purpose described.

8. In a malt-stirring machine, an adjustable share provided with a flexible edge, substantially as and for the purposes described.

ANDREW JACKSON REYNOLDS.

Witnesses:
WM. H. MYERS,
G. V. MOREY.